United States Patent
Takahashi

(10) Patent No.: US 10,544,863 B2
(45) Date of Patent: Jan. 28, 2020

(54) TRANSMISSION FOR VEHICLE AND ENGINE

(71) Applicant: SUZUKI MOTOR CORPORATION, Hamamatsu-Shi, Shizuoka (JP)

(72) Inventor: Hideaki Takahashi, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 404 days.

(21) Appl. No.: 15/384,524

(22) Filed: Dec. 20, 2016

(65) Prior Publication Data

US 2017/0227124 A1    Aug. 10, 2017

(30) Foreign Application Priority Data

Feb. 5, 2016    (JP) .................................. 2016-021164

(51) Int. Cl.
*F16H 63/18*    (2006.01)
*F16H 3/091*    (2006.01)

(52) U.S. Cl.
CPC ............. *F16H 63/18* (2013.01); *F16H 3/091* (2013.01)

(58) Field of Classification Search
CPC ................................ F16H 63/18; F16H 3/091
USPC ........................................................ 74/337.5
See application file for complete search history.

(56) References Cited

U.S. PATENT DOCUMENTS

| 9,303,764 | B2* | 4/2016 | Saitoh | ...................... F16H 63/38 |
| 9,499,042 | B2* | 11/2016 | Barth | ...................... B60K 6/48 |
| 2005/0081664 | A1 | 4/2005 | Kawakubo et al. | |
| 2009/0205455 | A1* | 8/2009 | Kosugi | ..................... F16H 63/18 74/473.21 |
| 2012/0118091 | A1* | 5/2012 | Yamazaki | ............... F16H 3/089 74/352 |
| 2013/0247703 | A1* | 9/2013 | Ogasawara | ............. F16H 59/04 74/473.21 |
| 2015/0135691 | A1 | 5/2015 | Yajima et al. | |
| 2017/0006756 | P1 | 1/2017 | Klemm et al. | |
| 2017/0067560 | A1 | 3/2017 | Takahashi | |

FOREIGN PATENT DOCUMENTS

| DE | 102016116841 A1 | 3/2017 |
| JP | 56-116955 A | 9/1981 |
| JP | 64-49743 A | 2/1989 |
| JP | 2005127392 A | 5/2005 |

(Continued)

OTHER PUBLICATIONS

German Office Action dated on Sep. 7, 2017 during the prosecution of German Patent Application No. 102017102030.6.

(Continued)

*Primary Examiner* — Ha Dinh Ho
(74) *Attorney, Agent, or Firm* — Troutman Sanders LLP

(57) ABSTRACT

A transmission for vehicle includes a counter shaft, a drive shaft, a shift fork, a shift cam, and a shift cam stopper. The counter shaft has a plurality of counter gears. The drive shaft has a plurality of driven gears. The shift fork changes combinations between the plurality of counter gears and the plurality of driven gears. The shift cam moves the shift fork. The shift cam stopper holds a position of the shift cam. Viewing from an axial direction of the shift cam, the shift cam stopper is disposed at a position partially overlapping with the shift fork.

7 Claims, 10 Drawing Sheets

(56) References Cited

FOREIGN PATENT DOCUMENTS

JP 4501405 B2 4/2010
JP 2015-98919 A 5/2015

OTHER PUBLICATIONS

Office Action issued in Chinese Patent Application No. 201710064410.6 dated May 31, 2018.
Notice of Reasons of Refusal dated Aug. 20, 2019 in corresponding Japanese Application No. 2016-021164.
Examination Report issued in corresponding Indian Patent Application No. 201614043074 dated Nov. 14, 2019.

* cited by examiner

TRANSMISSION FOR VEHICLE AND ENGINE

CROSS-REFERENCE TO RELATED APPLICATIONS

This application is based upon and claims the benefit of priority of the prior Japanese Patent Application No. 2016-021164, filed on Feb. 5, 2016, the entire contents of which are incorporated herein by reference.

BACKGROUND OF THE INVENTION

Field of the Invention

The present invention relates to a transmission and an engine for vehicle.

Description of the Related Art

Some engines mounted to a vehicle such as a motorcycle include a transmission. The transmission includes a counter shaft and a drive shaft. A rotation is transmitted from a crankshaft to the counter shaft with a plurality of counter gears. A rotation is transmitted from the counter shaft to the drive shaft with a plurality of driven gears meshing with the plurality of counter gears. By changing a combination of the counter gears and the driven gears, the transmission shifts gears.

A transmission for vehicle disclosed in Patent Document 1 includes a shift pedal shaft, a shift drive plate, a shift cam, a shift fork, and a shift fork shaft as a shift device. In the shift device, a shift operation input from the shift pedal shaft swings the shift drive plate, thus rotating the shift cam. According to the rotation of the shift cam, the shift fork slides along the shift fork shaft. Then, a plurality of counter gears and a plurality of driven gears also slide, thus changing a combination of the counter gears and the driven gears meshing with one another. A shift arm stopper is disposed near a shift stopper plate and holds the shift stopper plate to avoid unguarded turning.

Patent Document 1: Japanese Laid-open Patent Publication No. 2005-127392

The transmission for vehicle of Patent Document 1 disposes the shift arm stopper at a position away from the transmission. Disposing the shift arm stopper away from the transmission ensures easily configuring a structure to hold the shift stopper plate with the shift arm stopper; however, this causes a problem of increase in size of the transmission. Disposing the shift arm stopper away from the transmission fails to concentrate components of the transmission, possibly deteriorating motion performance of the vehicle.

SUMMARY OF THE INVENTION

The present invention has been made to solve the above-described points and an object of the present invention is to ensure downsizing of a transmission.

A transmission for vehicle according to the present invention includes a counter shaft, a drive shaft, a shift fork, a shift cam, and a shift cam stopper. To the counter shaft, a rotation is transmitted from a crankshaft. The counter shaft has a plurality of counter gears. To the drive shaft, a rotation is transmitted from the counter shaft. The drive shaft has a plurality of driven gears meshing with the plurality of counter gears. The shift fork changes combinations between the plurality of counter gears and the plurality of driven gears. The shift cam moves the shift fork. The shift cam stopper holds a position of the shift cam. Viewing from an axial direction of the shift cam, the shift cam stopper is disposed at a position partially overlapping with the shift fork.

DETAILED DESCRIPTION OF THE PREFERRED EMBODIMENTS

The following describes preferred embodiments of a transmission for vehicle according to the present invention with reference to the drawings.

Figure 1:
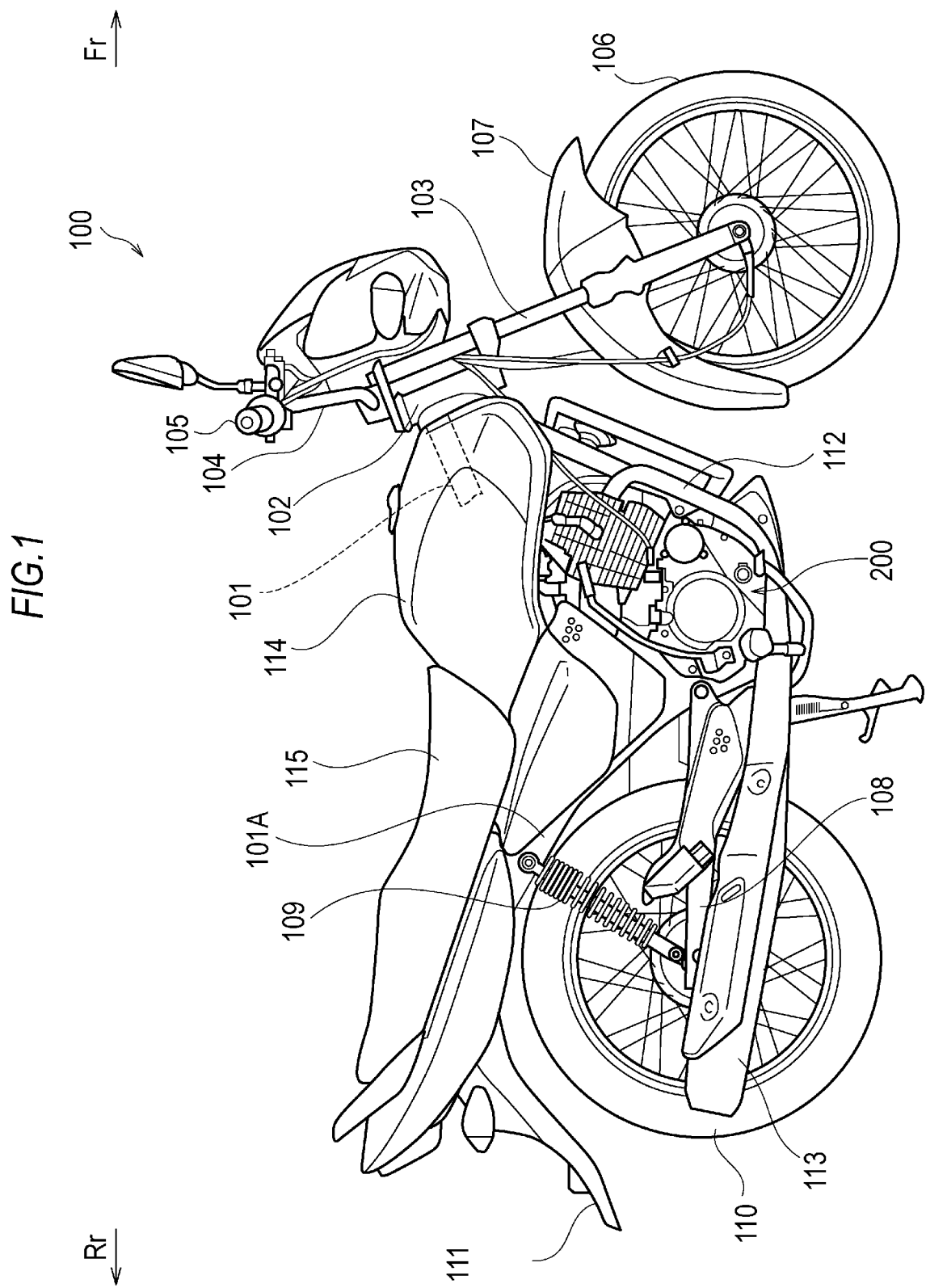
FIG. 1 is a right side view of a motorcycle that includes a transmission of this embodiment.

FIG. 1 is a right side view of a motorcycle 100 that includes a transmission of this embodiment. Firstly, a description will be given of an overall configuration of the motorcycle 100 with reference to FIG. 1. Including FIG. 1, in the respective drawings used in the following description, an arrow Fr and an arrow Rr indicate forward and rearward of the vehicle respectively as necessary. An arrow R and an arrow L indicate the right side and the left side of the side of the vehicle, respectively.

In FIG. 1, a vehicle body frame 101 (main frame) is made of steel or aluminum alloy material. The vehicle body frame 101 includes two right and left front forks 103 turnably supported to right and left by a steering head pipe 102 in the front portion. A handlebar 104 is fixed on the upper end of the front forks 103, and includes grips 105 at both ends of the handlebar 104. On the lower portion of the front forks 103, a front wheel 106 is rotatably supported, and a front fender 107 is fixed to cover the upper portion of the front wheel 106.

The vehicle body frame 101 is integrally joined to the rear portion of the steering head pipe 102 and is extended to the rear. A seat rail 101A is appropriately inclined from the vicinity of the rear portion of the vehicle body frame 101 obliquely upward to the rear and extends to the rear to support a seat 115, which will be described later. A rear shock absorber 109 is installed in a predetermined manner between the seat rail 101A and a swing arm 108 at the rear portion of the vehicle body frame 101. The rear shock absorber 109 swingably joins the swing arm 108. To the rear end of the swing arm 108, a rear wheel (driving wheel) 110 is rotatably supported. The rear wheel 110 is rotatably driven via a driven sprocket around which a chain, which transmits power of an engine 200, which will be described later, is wound. Above the rear wheel 110, a rear fender 111 is disposed.

Air-fuel mixture constituted of air and fuel supplied from an air cleaner and a fuel supply device (not illustrated), respectively is supplied to the engine 200 mounted to the vehicle body frame 101. Exhaust gas after burning inside the engine 200 passes through an exhaust pipe 112 and is exhausted from a muffler 113. Above the engine 200, a fuel tank 114 is supported by the vehicle body frame 101. The seat 115 is supported by the seat rail 101A at a rear of the fuel tank 114.

The following describes a configuration of the engine 200 as an internal combustion engine.

Figure 2:
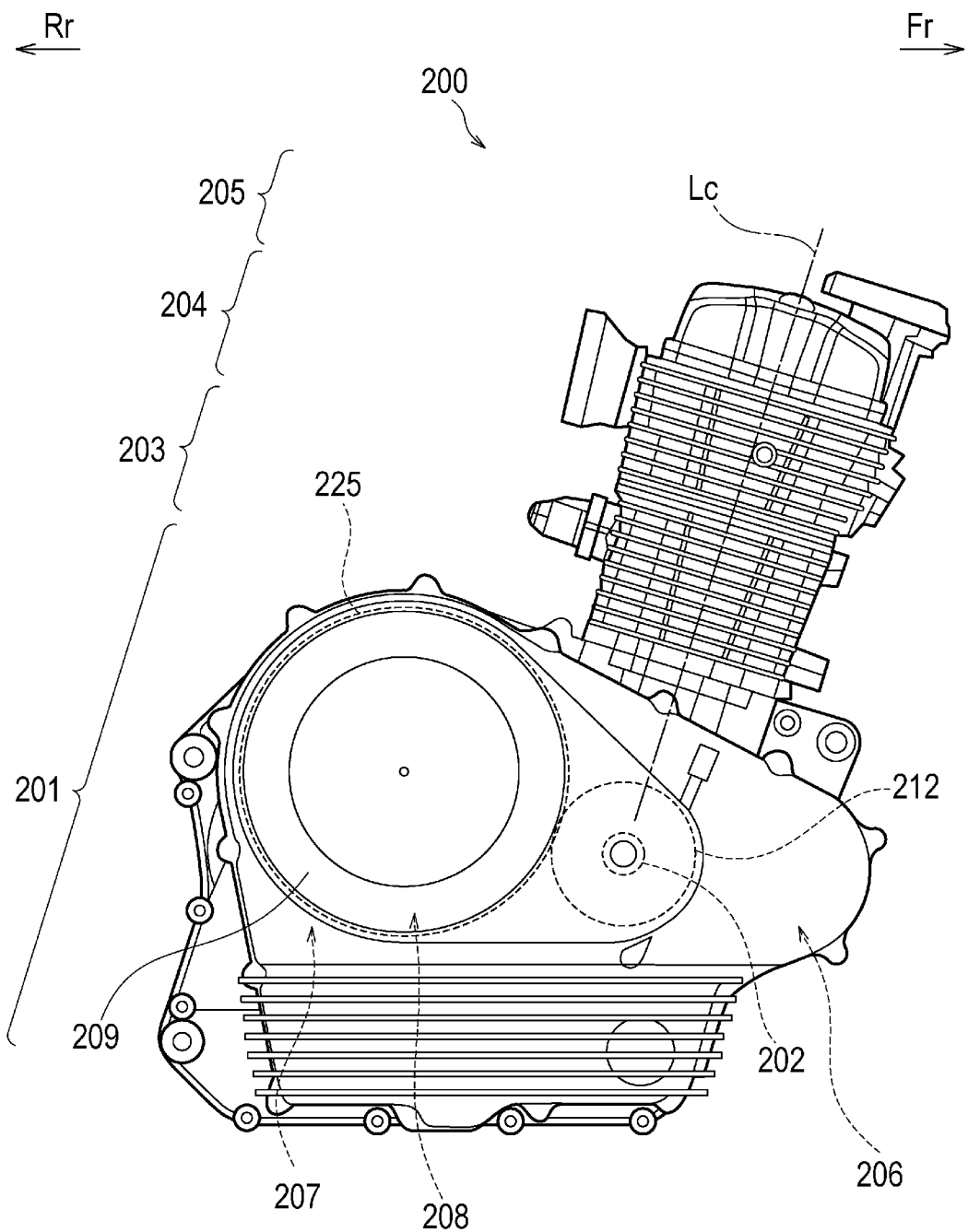
FIG. 2 is a side view illustrating an overall configuration of an engine.

FIG. 2 is a side view illustrating an overall configuration of the engine 200 according to this embodiment. The engine 200 of this embodiment employs a parallel multi-cylinder engine, specifically, a four-cycle parallel two-cylinder engine. The engine 200 is integrally joined to the vehicle body frame 101 via a plurality of engine mounts and acts as a rigid member of the vehicle body frame 101 by itself.

The engine 200 includes a crankcase 201, a cylinder 203, a cylinder head 204, and a cylinder head cover 205 continuously. The crankcase 201 houses a crankshaft 202 and rotatably supports the crankshaft 202. The cylinder 203 houses a piston in a vertically movable manner. The cylinder head. 204 houses a valve gear. The cylinder head cover 205 is attached to and lids the cylinder head 204. With the engine 200 according to this embodiment, a cylinder axis line Lc of the cylinder 203 inclines from the crankshaft 202 toward obliquely upward to the front.

The crankcase 201 forms a crank chamber 206, a transmission chamber 207, which is positioned at a rear side of the crank chamber 206, a clutch chamber 208, which is positioned at the right (one side) of the transmission chamber 207, and a similar member. The clutch chamber 208 is covered with a clutch cover 209 from the right. The crankcase 201 of this embodiment is formed divided to the right and left near a vehicle width center. The crank chamber 206 and the transmission chamber 207 are positioned so as to stride over the split surface. The clutch chamber 208 is surrounded by the right crankcase 201 and the clutch cover 209, which covers the right crankcase 201 from the right.

Figure 3:
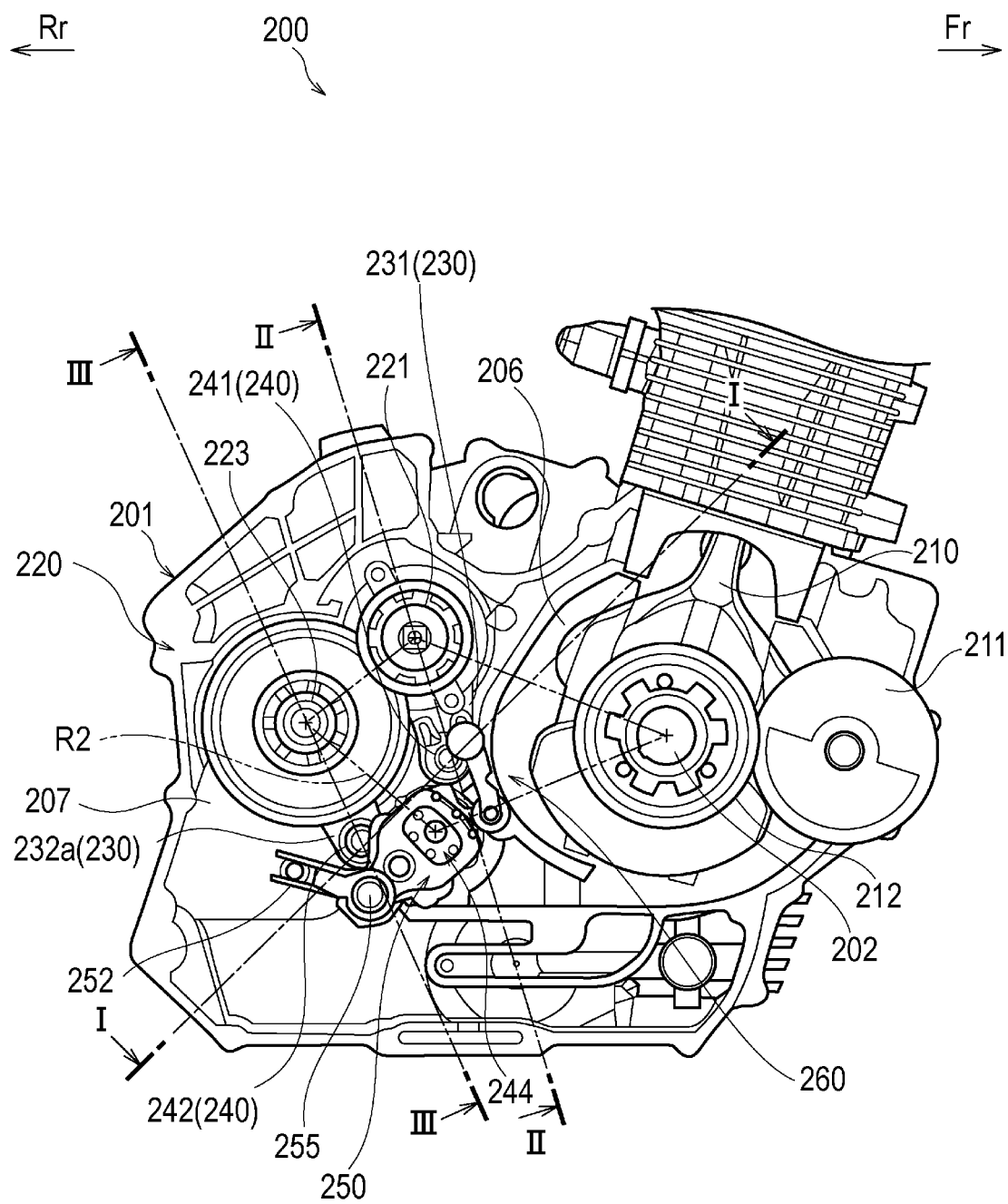
FIG. 3 is a drawing illustrating a configuration inside a crankcase.

FIG. 3 is a drawing illustrating a configuration inside the crankcase 201 and illustrates a state of removing the right crankcase 201.

The crank chamber 206 rotatably houses the crankshaft 202.

To the crankshaft 202, a piston is swingably mounted via a connecting rod 210. A balancer 211 is disposed at the front of the crankshaft 202. A primary drive gear 212 is pivotably supported to a right end of the crankshaft 202. The transmission chamber 207 and the clutch chamber 208 house a transmission 220. That is, the crankcase 201 also functions as a case for the transmission 220.

The following describes a configuration of the transmission 220 with reference to FIG. 4 to FIG. 10.

Figure 4:
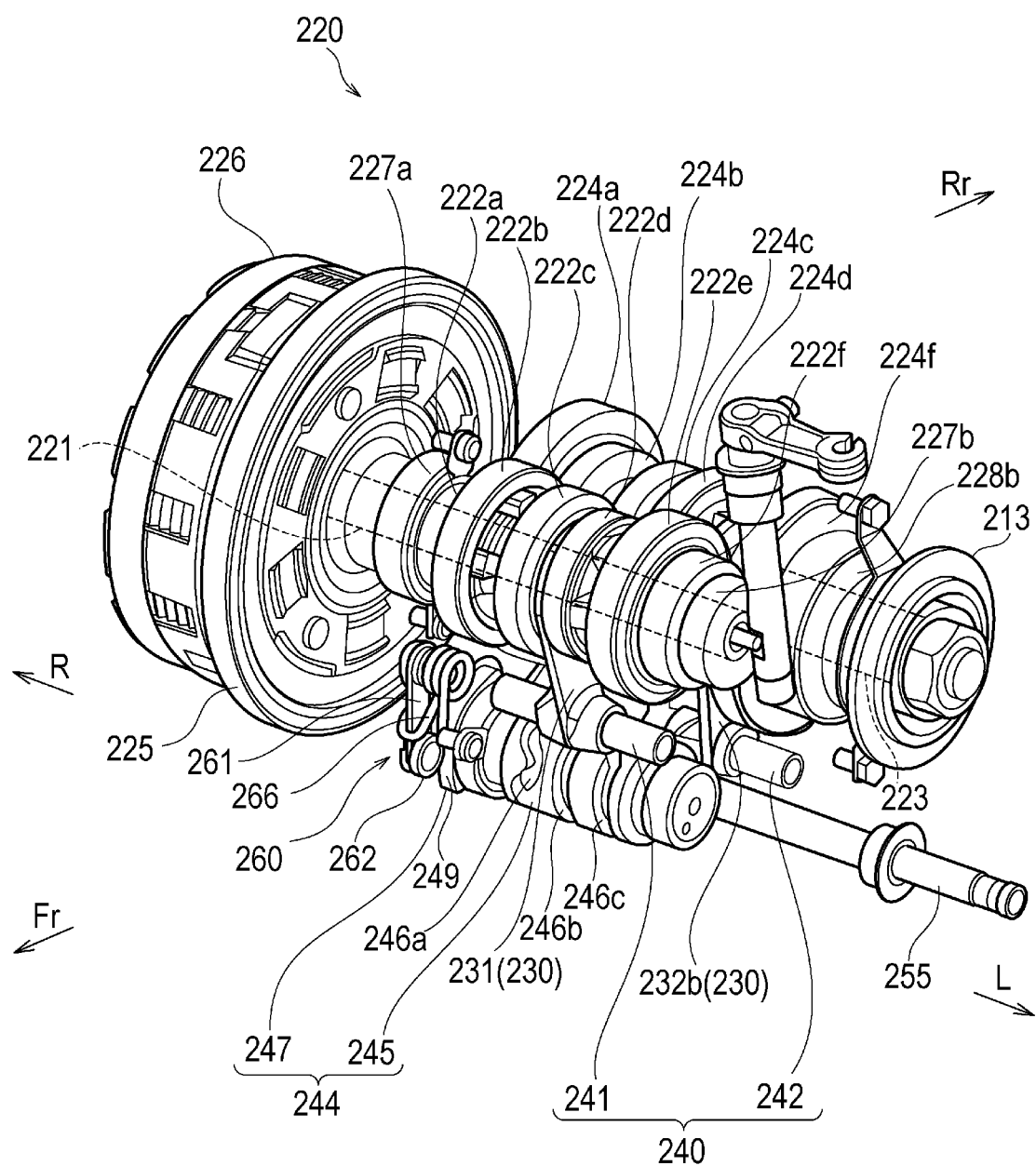
FIG. 4 is a perspective view illustrating a configuration of the transmission.
Figure 5:
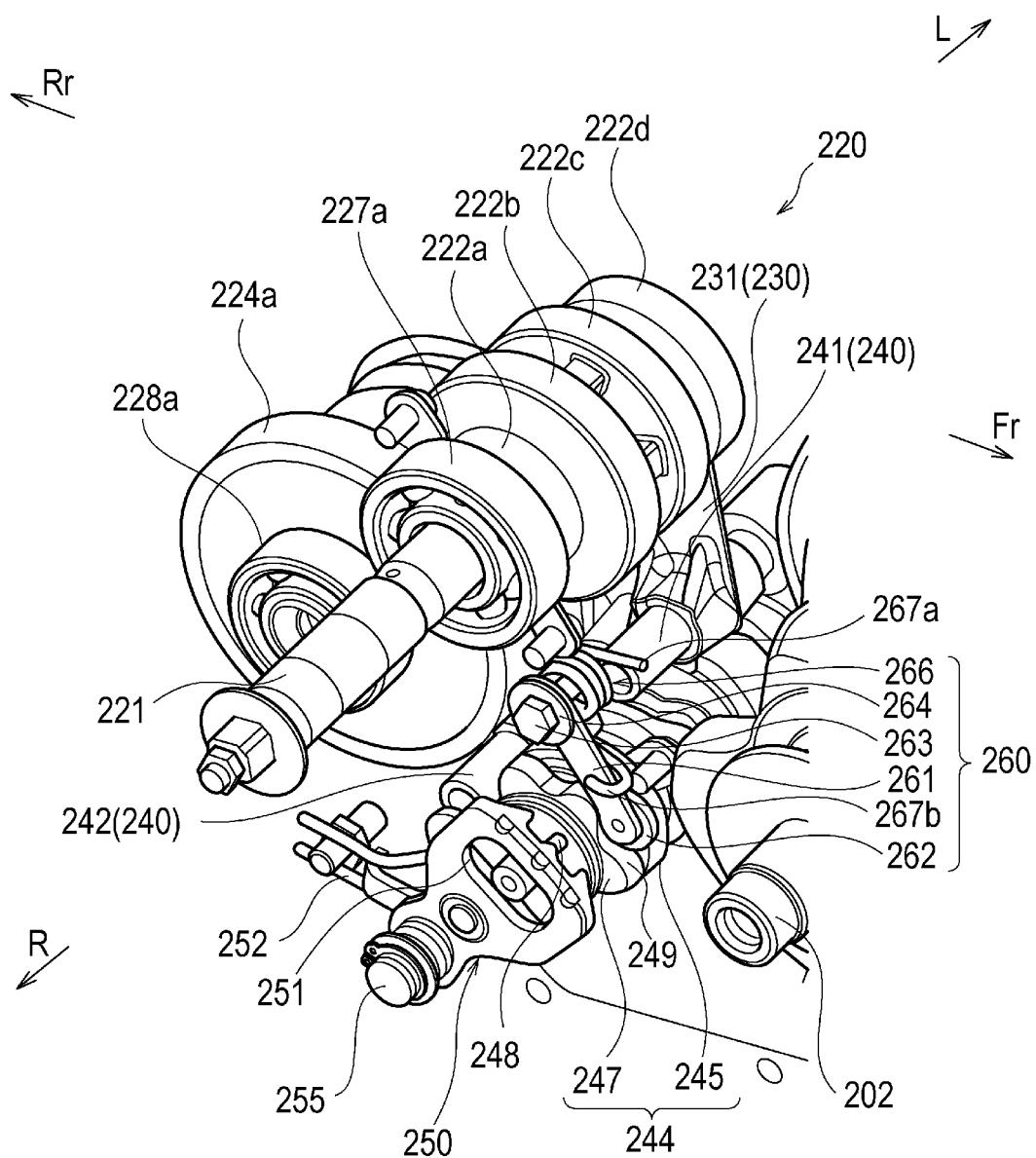
FIG. 5 is a perspective view illustrating the configuration of the transmission.
Figure 6:
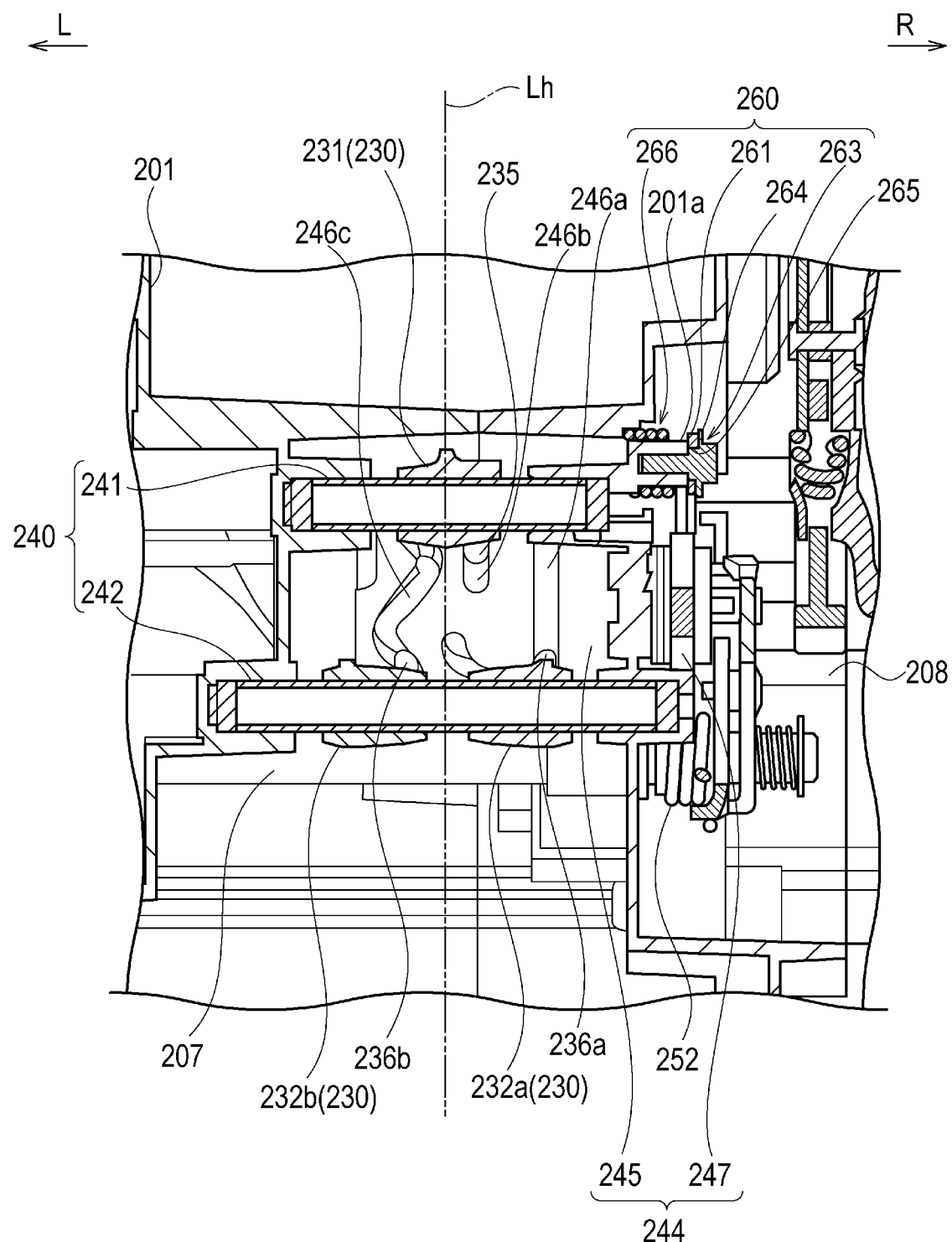
FIG. 6 is a cross-sectional view taken along the line I-I shown in FIG. 3.
Figure 7:
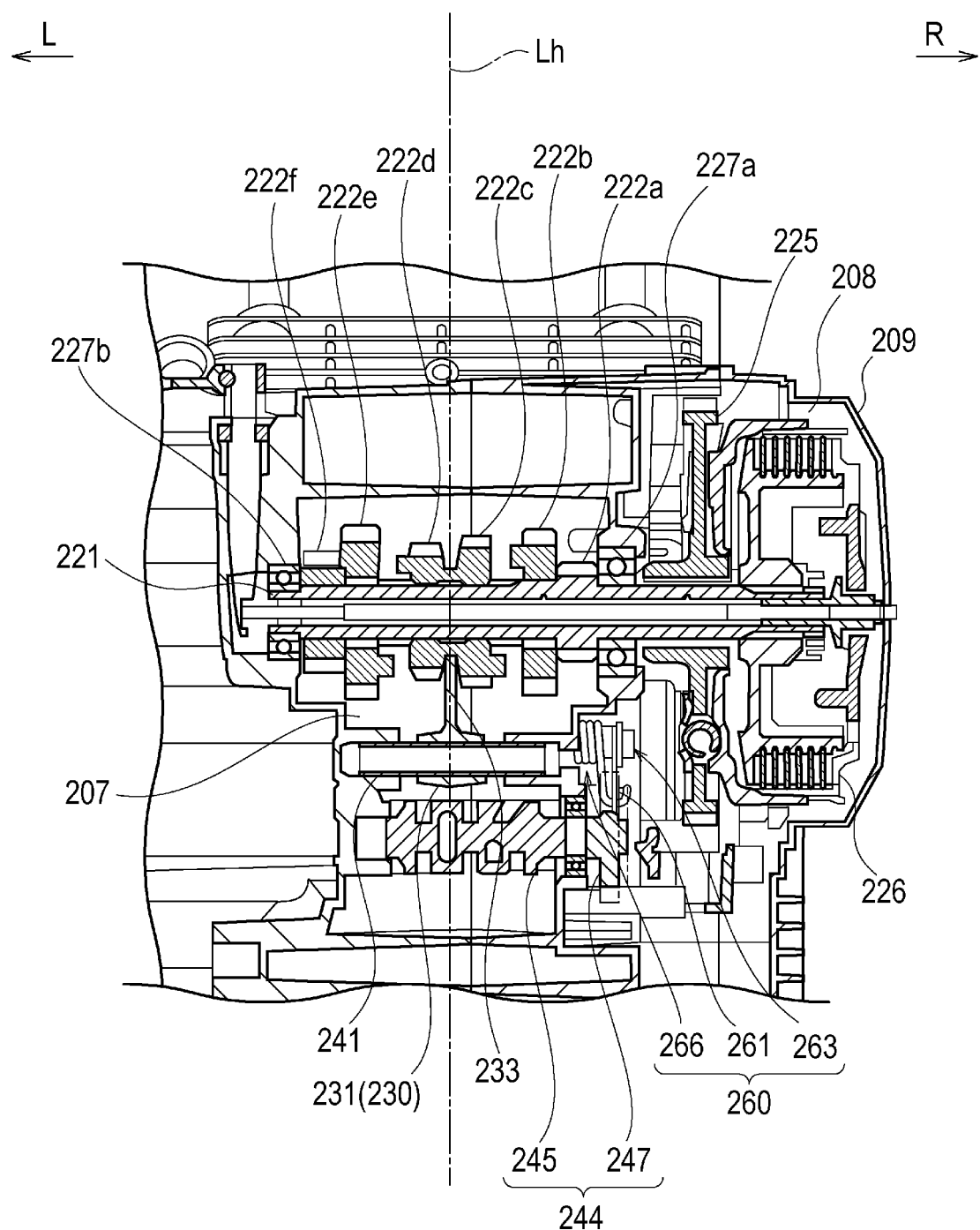
FIG. 7 is a cross-sectional view taken along the line II-II shown in FIG. 3.
Figure 8:
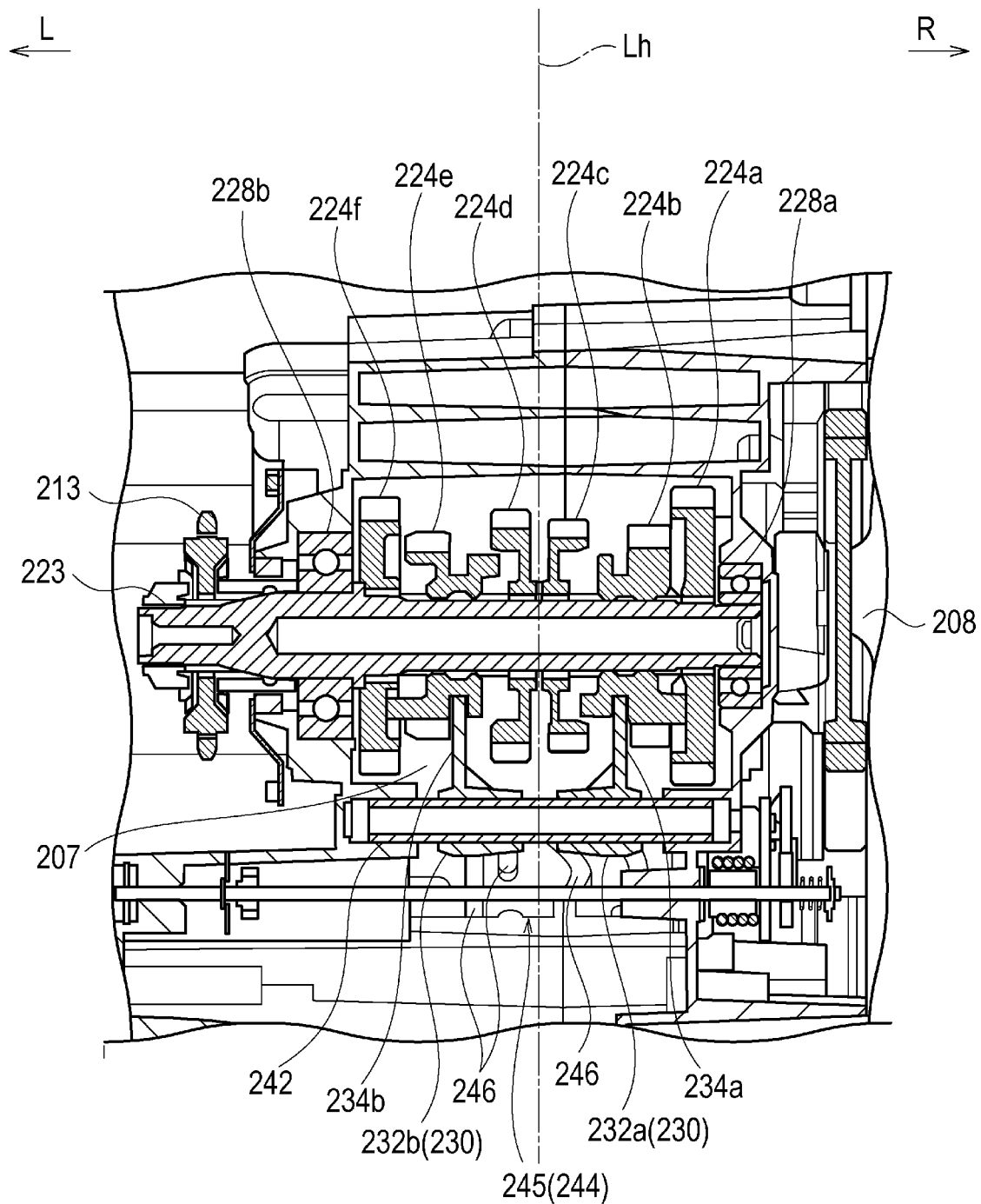
FIG. 8 is a cross-sectional view taken along the line III-III shown in FIG. 3.
Figure 9:
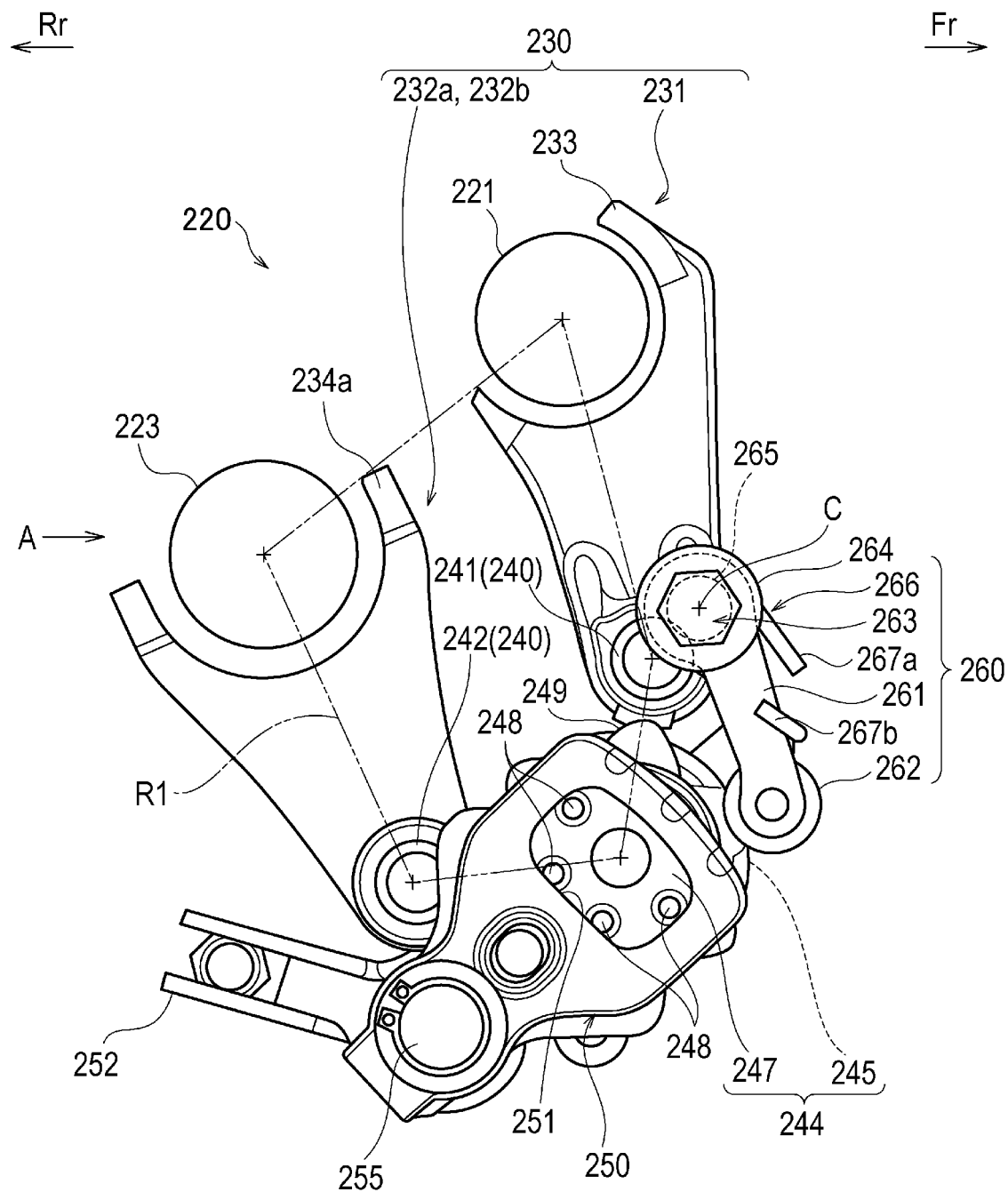
FIG. 9 is a drawing illustrating a part of the configuration of the transmission.
Figure 10:
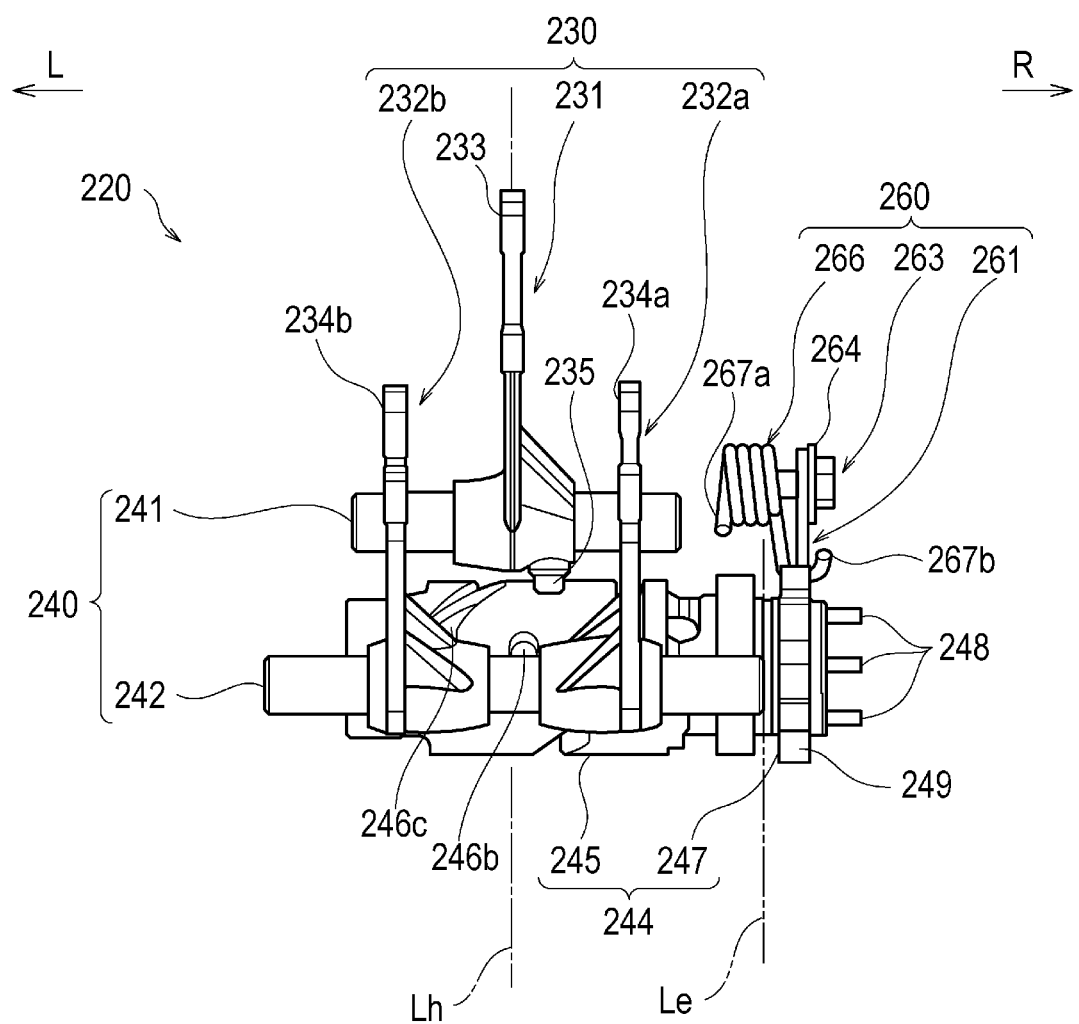
FIG. 10 is a drawing illustrating a part of the configuration of the transmission.

FIG. 4 is a perspective view viewing the transmission 220 from the front side and the left side. FIG. 5 is a perspective view viewing the transmission 220 from the front side and the right side. FIG. 6 is a cross-sectional view cut off along the line I-I illustrated in FIG. 3 and viewing the cut surface from an arrow direction. FIG. 7 is a cross-sectional view cut off along the line II-II illustrated in FIG. 3 and viewing the cut surface from an arrow direction. FIG. 8 is a cross-sectional view cut off along the line III-III illustrated in FIG. 3 and viewing the cut surface from an arrow direction. FIG. 9 is a drawing illustrating a part of the configuration of the transmission 220. FIG. 10 is a drawing illustrating a part of the configuration of the transmission 220 viewing from an arrow A direction illustrated in FIG. 9.

The transmission 220 includes a counter shaft 221, a drive shaft 223, a shift fork 230, a shift fork shaft 240, a shift cam 244, a shift arm 250, a shift cam stopper 260, and a similar member.

The counter shaft 221 and the drive shaft 223 are disposed mainly in the transmission chamber 207 parallel to the transmission chamber 207.

As illustrated in FIG. 3, the counter shaft 221 is positioned rearward and upward of the crankshaft 202. The drive shaft 223 is positioned rearward and downward of the counter shaft 221. Accordingly, the crankshaft 202, the counter shaft 221, and the drive shaft 223 are disposed in this order from the front to the rear.

As illustrated in FIG. 4, to the right of the counter shaft 221, a primary driven gear 225 is pivotably supported. The primary driven gear 225 rotates integrally with the counter shaft 221 and meshes with the primary drive gear 212. A clutch 226 is disposed at a right end of the counter shaft 221. The primary driven gear 225 and the clutch 226 are disposed in the clutch chamber 208. The clutch 226 engages and disengages a transmission of the rotation between the primary driven gear 225 and the counter shaft 221. Specifically, with the clutch 226 coupled, the rotation of the crankshaft 202 is transmitted to the counter shaft 221. Meanwhile, with the clutch 226 disconnected, the primary driven gear 225 races and the rotation of the crankshaft 202 is not transmitted to the counter shaft 221.

A drive sprocket 213, which rotates integrally with the drive shaft 223, is pivotably supported to the left end of the drive shaft 223.

A plurality of shift gears are disposed at the respective counter shaft 221 and drive shaft 223. The counter shaft 221 includes six counter gears 222a to 222f with different sizes. The drive shaft 223 includes six driven gears 224a to 224f with different sizes. The counter gears 222a to 222f each mesh with the driven gears 224a to 224f. The counter gears 222a to 222f are each formed with a diameter smaller than the driven gears 224a to 224f.

As illustrated in FIG. 7, among the counter gears 222a to 222f, the counter gear 222a and the counter gear 222f rotate integrally with the counter shaft 221. The counter gear 222b and the counter gear 222e are rotatable relative to the counter shaft 221. The counter gear 222c and the counter gear 222d are integrally configured and are slidable in an axial direction of the counter shaft 221. The counter shaft 221 is journaled to a bearing 227a, which is disposed to the right of the counter gear 222a, and a bearing 227b, which is disposed to the left of the counter gear 222f.

Meanwhile, as illustrated in FIG. 8, among the driven gears 224a to 224f, the driven gear 224a, the driven gear 224c, the driven gear 224d, and the driven gear 224f are rotatable relative to the drive shaft 223. The driven gear 224b and the driven gear 224e are slidable in an axial direction of the drive shaft 223. The drive shaft 223 is journaled to a bearing 228a, which is disposed to the right of the driven gear 224a, and a bearing 228b, which is disposed to the left of the driven gear 224f.

The shift fork 230 is movable, specifically, slidable along the shift fork shaft 240. As illustrated in FIG. 10, the shift fork 230 includes a counter side shift fork 231 as a first shift fork, and a drive side right shift fork 232a and a drive side left shift fork 232b as a second shift fork. The shift fork shaft 240 includes a counter side shift fork shaft 241 as a first shift fork shaft and a drive side shift fork shaft 242 as a second shift fork shaft. The counter side shift fork shaft 241 and the drive side shift fork shaft 242 are disposed parallel to the crankshaft 202 and are journaled to the crankcase 201. The counter side shift fork shaft 241 slidably supports the counter side shift fork 231 in the axial direction. The drive side shift fork shaft 242 slidably supports the drive side right shift fork 232a and the drive side left shift fork 232b in the axial direction. The counter side shift fork 231 is positioned between the drive side right shift fork 232a and the drive side left shift fork 232b.

As illustrated in FIG. 9, the counter side shift fork shaft 241 is positioned below the counter shaft 221 and in front of the drive shaft 223. Meanwhile, the drive side shift fork shaft 242 is positioned below the drive shaft 223 and rearward with respect to the counter side shift fork shaft 241. As illustrated in FIG. 10, the counter side shift fork shaft 241 has a length shorter than the drive side shift fork shaft 242 in a vehicle-width direction. A right end portion of the counter side shift fork shaft 241 is positioned on a vehicle width center line Lh side with respect to a right end portion of the drive side shift fork shaft 242. Similarly, a left end portion of the counter side shift fork shaft 241 is positioned on the vehicle width center line Lh side with respect to a left end portion of the drive side shift fork shaft 242. That is, the respective right end portion and left end portion of the counter side shift fork shaft 241 are positioned inside with respect to the right end portion and the left end portion of the drive side shift fork shaft 242.

As illustrated in FIG. 9 and FIG. 10, the counter side shift fork 231 includes an approximately U-shaped fork 233 extending to the counter shaft 221. The drive side right shift fork 232a and the drive side left shift fork 232b each include approximately U-shaped forks 234a and 234b, which extend toward the drive shaft 223. As illustrated in FIG. 7, the fork 233 of the counter side shift fork 231 engages with the counter gear 222c and the counter gear 222d. Meanwhile, as illustrated in FIG. 8, the fork 234a of the drive side right shift fork 232a engages with the driven gear 224b and the fork 234b of the drive side left shift fork 232b engages with the driven gear 224e.

As illustrated in FIG. 6, the counter side shift fork 231 has a protrusion 235 extending toward the shift cam 244. Similarly, the drive side right shift fork 232a and the drive side left shift fork 232b include protrusions 236a and 236b extending toward the shift cam 244.

The shift cam 244 is disposed parallel to the crankshaft 202 and is turnably supported by the crankcase 201. As illustrated in. FIG. 3, the shift cam 244 is positioned below the crankcase 201. As illustrated in FIG. 9, the shift cam 244 is positioned below a straight line connecting a central axis of the counter shaft 221 and a central axis of the drive shaft 223. Further, the shift cam 244 is positioned below the counter side shift fork shaft 241 and in front of the drive side shift fork shaft 242.

As illustrated in FIG. 5, the shift cam 244 includes a cam body 245 and a stopper plate 247. The cam body 245 is a cylindrical cam. On an outer peripheral surface of the cam body 245, a plurality of respective cam grooves 246a to 246c are formed into a shape so as to be partially meandering (see FIG. 4, FIG. 6, and FIG. 10). The cam grooves 246a to 246c each engage with the protrusion 236a of the drive side right shift fork 232a, the protrusion 235 of the counter side shift fork 231, and the protrusion 236b of the drive side left shift fork 232b. The stopper plate 247 is secured to the right end portion of the cam body 245 and formed into a plate shape with a predetermined thickness in the axial direction. A plurality of shift pins 248 (see FIG. 9) are disposed on the right end surface of the stopper plate 247. The plurality of shift pins 248 are pin-shaped members projecting to the right in the axial direction. The plurality of shift pins 248 are disposed at positions away from a predetermined distance from the central axis of the shift cam 244 in the radial direction so as to be arranged at regular intervals in the circumferential direction. Concave positioning portions 249 are formed on the outer peripheral surface of the stopper plate 247 at regular intervals in the circumferential direction. In the shift cam 244, the cam body 245 is disposed at the transmission chamber 207, and the stopper plate 247 is disposed in the clutch chamber 208.

The shift arm 250 is disposed covering the shift cam 244 from the right and is pivotably supported to the right end portion of a shift shaft 255. The shift shaft 255 is disposed parallel to the crankshaft 202 and is rotatably supported to the crankcase 201. As illustrated in FIG. 3, the shift shaft 255 is positioned below the crankcase 201. As illustrated in FIG. 9, the shift shaft 255 is positioned below the straight line connecting the central axis of the counter shaft 221 and the central axis of the drive shaft 223. The shift shaft 255 is positioned rearward with respect to the shift cam 244 and forward with respect to the drive shaft 223. The shift shaft 255 turns in conjunction with a shift operation by an occupant. The shift shaft 255, for example, turns in one direction by the shift operation for upshift and turns in the other direction by the shift operation for downshift.

The shift arm 250 is formed into a plate shape with a spatula shape extending from the shift shaft 255 to the right side of the stopper plate 247. The shift arm 250 includes an approximately rectangular-shaped opening 251 engaging with some of the shift pins 248 on the stopper plate 247. The shift arm 250 swings around the shift shaft 255 in conjunction with the turning of the shift shaft 255. To return the shift arm 250 to a neutral state aster the swing, a return spring 252 is mounted to the shift shaft 255. Swinging the shift arm 250 turns the stopper plate 247 via some of the engaged shift pins 248, and the cam body 245 also similarly turns. When returning to the neutral state after the swing, the shift arm 250 engages with the shift pins 248 different from the shift pins 248 engaged in the neutral state before the swing.

The shift cam stopper 260 is positioned close to the stopper plate 247 of the shift cam 244 and is disposed in the clutch chamber 208. The shift cam stopper 260 includes a stopper body 261, a bolt 263 as a mounting portion, and a stopper spring 266 as a biasing portion. The stopper body 261 is formed into an arm shape with an insertion hole at the base end thereof. An insertion of the bolt 263 through the insertion hole rotatably supports the stopper body 261. As illustrated in FIG. 9, a rotational center axis C of the stopper body 261 is positioned upward with respect to the central axis of the shift cam 244. A roller 262 is rotatably mounted to a distal end of the stopper body 261. A flange 264 is integrally joined to a bolt head of the bolt 263 together. A disc-shaped journal 265 is formed on a screw side adjacent to the flange 264. The journal 265 on the bolt 263 rotatably supports the stopper body 261. As illustrated in FIG. 6, screwing the bolt 263 from the clutch chamber 208 side to an inside of a boss 201a, which is formed at a sidewall of the right crankcase 201, mounts the stopper body 261 to the crankcase 201. At this time, the stopper body 261 is positioned between the flange 264 of the bolt 263 and the crankcase 201. The stopper spring 266 is a coil spring and is disposed at the peripheral area of the boss 201a such that an axis line of the stopper spring 266 goes along an axis line of the bolt 263. As illustrated in FIG. 9, one end portion 267a of the stopper spring 266 is brought into close abutment with the crankcase 201 while an other end portion 267b is brought into close abutment with the stopper body 261. In the stopper plate 247, a biasing from the stopper spring 266 causes the roller 262 to press the positioning portion 249 of the stopper plate 247. Accordingly, the roller 262 engages with the positioning portion 249 on the stopper plate 247 to position and hold the shift cam 244. This ensures preventing unguarded turning of the shift cam 244 due to a vibration of the engine 200 or a similar cause.

The following describes operations to shift gears of the transmission 220 according to the shift operation by the occupant.

The shift operation by the occupant through a shift change pedal and a similar member turns the shift shaft 255 in any of the one direction or the other direction. In conjunction with the turning of the shift shaft 255, the shift arm 250 swings. Swinging the shift arm 250 turns the stopper plate 247 via some of the shift pins 248 engaging with the opening 251 and similarly turns the cam body 245. At this time, the stopper plate 247 turns against the biasing via the stopper spring 266 of the shift cam stopper 260. Turning the stopper plate 247 by a predetermined angle biases the stopper plate 247 by the stopper spring 266 and positions the stopper plate 247.

Meanwhile, the turning of the cam body 245 slides the counter side shift fork 231 engaging with cam grooves 246 on the cam body 245 in the axial direction of the counter side shift fork shaft 241 according to the shape of the cam grooves 246b. Similarly, the drive side right shift fork 232a and the drive side left shift fork 232b slide in the axial direction of the drive side shift fork shaft 242 according to the shape of the cam grooves 246a and 246c. Accordingly, at least any one of gears among the counter gear 222c, the counter gear 222d, the driven gear 224b, and the driven gear 224e slides in the axial direction of the counter shaft 221 or the drive shaft 223.

Thus, sliding at least any one of the gears among the counter gear 222c, the counter gear 222d, the driven gear 224b and the driven gear 224e changes a transmission route of the rotation from the counter shaft 221 to the drive shaft 223. In other words, this changes combinations between the plurality of counter gears 222a to 222f and the plurality of driven gears 224a to 224f. Thus, the transmission 220 changes the combination between the plurality of counter gears 222a to 222f and the plurality of driven gears 224a to 224f to shift gears of the motorcycle 100.

The following describes a configuration to downsize the transmission 220 according to the embodiment with reference to FIG. 3, FIG. 9, and FIG. 10. In this embodiment, disposing the shift cam stopper 260 at an appropriate position achieves the downsizing of the transmission 220. Specifically, as illustrated in FIG. 9, viewing from the axial direction of the shift cam 244, the shift cam stopper 260 is disposed at a position partially overlapping with the shift fork 230, here the counter side shift fork 231. More specifically, in the shift cam stopper 260, the stopper body 261, the bolt 263, and the stopper spring 266 are disposed at positions overlapping with the counter side shift fork 231. Thus, disposing a part of the shift cam stopper 260 at the positions overlapping with the shift fork 230 ensures concentrically disposing the components of the transmission 220. As described above, the counter gears 222a to 222f of the counter shaft 221 have the diameter smaller than the driven gears 224a to 224f of the drive shaft 223. Accordingly, overlapping the shift cam stopper 260 with the counter side shift fork 231 close to the small-diameter counter gears 222a to 222f allows an increase in overlap amount between the shift cam stopper 260 and the counter side shift fork 231, thereby further concentrically disposing the components.

As illustrated in FIG. 10, the counter side shift fork 231 is positioned inside in the axial direction of the shift cam 244 with respect to the drive side right shift fork 232a, namely, the vehicle width center line Lh side. In view of this, a space is formed to the right of the counter side shift fork 231. Accordingly, disposing the shift cam stopper 260 to the right of (outside) the counter side shift fork 231 ensures bringing the shift cam stopper 260 close to the other components of the transmission 220. Accordingly, the components of the transmission 220 can be concentrically disposed.

As illustrated in FIG. 9, the shift cam stopper 260 is disposed at a position partially overlapping with the shift fork shaft 240, here the counter side shift fork shaft 241. More specifically, in the shift cam stopper 260, the stopper body 261, the bolt 263, and the stopper spring 266 are disposed at the positions overlapping with the counter side shift fork shaft 241. In the bolt 263, the flange 264 and the journal 265 overlap with the counter side shift fork shaft 241. Thus, disposing a part of the shift cam stopper 260 at the position overlapping with the shift fork shaft 240 allows concentrically disposing the components of the transmission 220.

As illustrated in FIG. 10, the right end portion of the counter side shift fork shaft 241 is positioned inside in the axial direction of the shift cam 244 with respect to the right end portion of the drive side shift fork shaft 242, namely, the vehicle width center line Lh side. In view of this, a space is formed to the right of the right end portion of the counter side shift fork shaft 241. Accordingly, disposing the shift cam stopper 260 to the right of (outside) the right end portion of the counter side shift fork shaft 241 ensures bringing the shift cam stopper 260 close to the other components of the transmission 220. Accordingly, the components of the transmission 220 can be concentrically disposed.

As illustrated in FIG. 10, a part of the shift cam stopper 260 is positioned inside in the axial direction of the shift cam 244 with respect to the right end portion of the drive side shift fork shaft 242, namely, the vehicle width center line Lh side. More specifically, in the shift cam stopper 260, a part of the stopper spring 266 is positioned to the left of (inside) the right end portion (an imaginary line Le illustrated in FIG. 10) of the drive side shift fork shaft 242. Accordingly, viewing from a direction perpendicular to the axial direction of the shift cam 244, a part of the shift cam stopper 260 can be disposed overlapped with the drive side shift fork shaft 242, thereby ensuring concentrically disposing the components of the transmission 220.

As illustrated in FIG. 7, a part of the shift cam stopper 260 is positioned inside in the axial direction of the shift cam 244 with respect to the right end portion of the counter gear 222a, which is positioned at the rightmost among the counter gears 222a to 222f, that is, the vehicle width center line Lh side. More specifically, in the shift cam stopper 260, a part of the stopper spring 266 is positioned to the left of (inside) the right end portion of the counter gear 222a. Accordingly, viewing from the direction perpendicular to the axial direction of the shift cam 244, a part of the shift cam stopper 260 can be disposed overlapped with the counter gear 222a, thereby ensuring concentrically disposing the components of the transmission 220. Similarly, in this embodiment, a part of the shift cam stopper 260 is positioned inside in the axial direction of the shift cam 244 with respect to the right end portion of the driven gear 224a, which is positioned at the rightmost among the driven gears 224a to 224f, that is, the vehicle width center line Lh side.

FIG. 9 illustrates an imaginary pentagon region R1 having the central axis of the counter shaft 221, the central axis of the drive shaft 223, the central axis of the drive side shift fork shaft 242, the central axis of the shift cam 244, and the central axis of the counter side shift fork shaft 241 as its apexes. A part of the shift cam stopper 260 is disposed at a position overlapping with the imaginary pentagon region R1. Specifically, a part of the flange 264 of the bolt 263 in the shift cam stopper 260 overlaps with the imaginary pentagon region R1. The main components of the transmission 220 are disposed at the peripheral area of the imaginary pentagon region R1. Accordingly, disposing a part of the shift cam stopper 260 overlapping with the imaginary pentagon region R1 allows concentrically disposing the components of the transmission 220. Here, although a part of the flange 264 in the shift cam stopper 260 overlaps with the imaginary pentagon region R1, another site of the shift cam stopper 260 may overlap with the imaginary pentagon region R1. Alternatively, the entire shift cam stopper 260 may overlap with the imaginary pentagon region R1.

FIG. 3 illustrates an imaginary quadrangle region R2 having the central axis of the crankshaft 202, the central axis of the counter shaft 221, the central axis of the drive shaft 223, and the central axis of the shift cam 244 as its apexes. A part of the shift cam stopper 260 is disposed at a position overlapping with the imaginary quadrangle region R2. The main components of the transmission 220 are disposed at the peripheral area of the imaginary quadrangle region R2. Accordingly, disposing a part of the shift cam stopper 260 overlapping with the imaginary quadrangle region R2 allows concentrically disposing the components of the transmission 220. The entire shift cam stopper 260 may overlap with the imaginary quadrangle region R2.

The engine 200 for a saddle-ride type vehicle such as the motorcycle 100 like this embodiment includes the transmission 220 in the crankcase 201 and accumulates engine oil below the crankcase 201. As illustrated in FIG. 9, in this engine 200, positioning the rotational center axis C of the shift cam stopper 260 upward with respect to the central axis of the shift cam 244 can forma space below the crankcase 201. Accordingly, for example, an oil pump, which pumps up the engine oil, can be disposed in the space formed below the crankcase 201. This ensures optimizing the arrangement of the components in the crankcase 201 and ensures concentrically disposing the components of the engine 200.

Thus, since this embodiment can concentrically dispose the components of the transmission 220, thereby ensuring downsizing the transmission 220. Concentrically disposing the components of the transmission 220 brings an advantage to a layout of the components of the engine 200, ensuring improving motion performance of the motorcycle 100 by the concentration of the components.

While the present invention has been described with the above-described embodiments, the present invention is not limited only to the above-described embodiments. Changes and similar modification are possible within the scope of the present invention.

The above-described embodiment describes the case where a part of the shift cam stopper 260 is disposed at the position overlapping with the counter side shift fork 231 and the counter side shift fork shaft 241; however, this should not be construed in a limiting sense. For example, with the two counter side shift forks and the one drive side shift fork, the drive side shift fork is positioned on the vehicle width center line Lh side with respect to the counter side shift forks and the end portion of the drive side shift fork shaft is positioned on the vehicle width center line Lh side with respect to the end portions of the counter side shift fork shafts. Accordingly, in this case, a part of the shift cam stopper 260 is preferably disposed at the position overlapping with the drive side shift fork and the drive side shift fork shaft.

The above-described embodiment describes the case where the shift cam stopper 260 is disposed to the right with respect to a travelling direction of the motorcycle 100; however, the shift cam stopper 260 may be disposed to the left. In this case, the stopper plate 247 of the shift cam 244, the shift arm 250, and a similar member are preferably disposed to the left.

The above-described embodiment describes the shift operation by the operation through the shift change pedal; however, this should not be constructed in a limiting sense. For example, the shift operation may be an operation through a switch disposed near the grip 105. Alternatively, an ECU as a control unit for the motorcycle 100 may detect the operation through the shift change pedal or the operation through the switch, and the ECU may turn the shift shaft 255 or the shift cam 244 via an actuator.

The above-described embodiment describes the case where the engine 200 is the parallel two-cylinder engine. However, this should not be construed in a limiting sense. The engine 200 may be an engine of different arrangement (for example, a V engine) and with different number of cylinders (for example, single cylinder and cylinders other than two cylinders).

The above-described embodiment describes the case where the engine 200 is applied to the motorcycle. However, this should not be constructed in a limiting sense. The engine 200 is also applicable to a vehicle with similar structure, for example, the saddle-ride type vehicle.

With the present invention, disposing a part of the shift cam stopper at the position overlapping with the shift fork ensures concentrically disposing the components of the transmission, thereby ensuring downsizing of the transmission.

What is claimed is:

1. A transmission for vehicle comprising:
   a counter shaft to which a rotation is transmitted from a crankshaft, the counter shaft having a plurality of counter gears;
   a drive shaft to which a rotation is transmitted from the counter shaft, the drive shaft having a plurality of driven gears meshing with the plurality of counter gears;
   a shift fork that changes combinations between the plurality of counter gears and the plurality of driven gears, wherein the shift fork comprises:
      a first shift fork that moves at least a part of the plurality of counter gears, and
      a second shift fork that moves at least a part of the plurality of driven gears;
   a shift cam that moves the shift fork; and
   a shift cam stopper that holds a position of the shift cam, wherein
   viewing from an axial direction of the shift cam, the shift cam stopper is disposed at a position overlapping with the shift fork different from the shift fork disposed outermost in the axial direction of the shift cam among the first shift fork and the second shift fork.

2. The transmission for vehicle according to claim 1, further comprising
   a shift fork shaft that journals the shift fork, wherein viewing from the axial direction of the shift cam, the shift cam stopper is disposed at a position partially overlapping with the shift fork shaft.

3. The transmission for vehicle according to claim 1, further comprising
a shift fork shaft comprising:
a first shift fork shaft that journals the first shift fork; and
a second shift fork shaft that journals the second shift fork,
an end portion at one side of one shift fork shaft among the first shift fork shaft and the second shift fork shaft is disposed inside in the axial direction of the shift cam with respect to an end portion at one side of an other of the shift fork shafts,
viewing from a direction orthogonal to the axial direction of the shift cam, the shift cam stopper is disposed at a position away from overlapping with one of the shift fork shafts, and
viewing from the axial direction of the shift cam, the shift cam stopper is disposed at a position partially overlapping with the end portion at the one side of the one shift fork shaft.

4. The transmission for vehicle according to claim 3, wherein
a part of the shift cam stopper is disposed inside in the axial direction of the shift cam with respect to the end portion at the one side of the other shift fork shaft.

5. The transmission for vehicle according to claim 1, wherein
viewing from a direction perpendicular to the axial direction of the shift cam, a part of the shift cam stopper is disposed inside with respect to a gear disposed outermost in the axial direction of the shift cam among the plurality of counter gears and the plurality of driven gears.

6. A transmission for vehicle according to claim 1, further comprising:
a counter shaft to which a rotation is transmitted from a crankshaft, the counter shaft having a plurality of counter gears;
a drive shaft to which a rotation is transmitted from the counter shaft, the drive shaft having a plurality of driven gears meshing with the plurality of counter gears;
a shift fork that changes combinations between the plurality of counter gears and the plurality of driven gears;
a shift cam that moves the shift fork;
a shift cam stopper that holds a position of the shift cam; and
a shift fork shaft that journals the shift fork, wherein
the shift fork comprises:
a first shift fork that moves at least a part of the plurality of counter gears; and
a second shift fork that moves at least a part of the plurality of driven gears,
wherein
the shift fork shaft comprises:
a first shift fork shaft that journals the first shift fork; and
a second shift fork shaft that journals the second shift fork, wherein
viewing from an axial direction of the shift cam, the shift cam stopper is disposed at a position partially overlapping with the shift fork,
viewing from the axial direction of the shift cam, at least a part of the shift cam stopper is disposed at a position overlapping with an imaginary pentagon region, the imaginary pentagon region being formed of a central axis of the counter shaft, a central axis of the drive shaft, a central axis of the second shift fork shaft, a central axis of the shift cam, and a central axis of the first shift fork shaft as apexes thereof.

7. An engine comprising:
a transmission for a vehicle;
a crankcase; and
a crankshaft rotatably supported to the crankcase, wherein
the transmission comprises:
a counter shaft to which a rotation is transmitted from the crankshaft, the counter shaft having a plurality of counter gears;
a drive shaft to which a rotation is transmitted from the counter shaft, the drive shaft having a plurality of driven gears meshing with the plurality of counter gears;
a shift fork that changes combinations between the plurality of counter gears and the plurality of driven gears;
a shift cam that moves the shift fork; and
a shift cam stopper that holds a position of the shift cam and, viewing from an axial direction of the shift cam, the shift cam stopper is disposed at a position partially overlapping with the shift fork,
viewing from the axial direction of the shift cam, at least a part of the shift cam stopper is disposed at a position overlapping with an imaginary quadrangle region, the imaginary quadrangle region being formed of a central axis of the crankshaft, a central axis of the counter shaft, a central axis of the drive shaft, and a central axis of the shift cam as apexes thereof.

* * * * *

UNITED STATES PATENT AND TRADEMARK OFFICE
CERTIFICATE OF CORRECTION

PATENT NO.          : 10,544,863 B2
APPLICATION NO.     : 15/384524
DATED               : January 28, 2020
INVENTOR(S)         : Hideaki Takahashi Page 1 of 1

It is certified that error appears in the above-identified patent and that said Letters Patent is hereby corrected as shown below:

In the Claims

Column (11); Line (37) delete "according to claim 1, further".

Signed and Sealed this
Thirtieth Day of June, 2020

Andrei Iancu
*Director of the United States Patent and Trademark Office*